United States Patent Office.

E. R. NORNY, OF McDONOUGH, DELAWARE.

Letters Patent No. 91,557, dated June 22, 1869; antedated June 10, 1869.

---

IMPROVED PROCESS FOR PRESERVING FRUITS.

---

The Schedule referred to in these Letters Patent and making part of the same.

---

*To all whom it may concern:*

Be it known that I, E. R. NORNY, of McDonough, in the county of New Castle, and State of Delaware, have invented a new and useful Improvement in Preserving Fruits in a Semi-Candied State; and I do hereby declare that the following is a full and exact description thereof.

The nature of my invention or discovery consists in preserving various kinds of fruit, such as peaches, pears, plums, in a semi-candied state, by first putting the fruit up in jars, in sirup made of fruit-juice and sugar, to which is added sulphite of lime, and after it has remained one month, more or less, subject to the action of the liquor, I take it out of the jars and coat it with pulverized sugar, and subject it to the action of heat in an oven, until the sugar forms a glazed surface to the fruit. I then pack the fruit in boxes for storage or transportation.

The mode of proceeding is as follows:

For a given quantity of fruit to be preserved, I take half a pound of sugar for each pound. I put the sugar and a small quantity of fruit-juice in a preserving-kettle, to form a sirup, and when it boils, add to it sulphite of lime, in the proportion of one ounce to fifty pounds of fruit. I then place in the sirup as much fruit as it will cover, and let it remain for from three to five minutes. I then, with a strainer-dipper, remove the fruit from the jars, and put in more fruit, which I treat in the same way, and thus continue the operation until the whole amount of fruit has been subjected to the action of the sirup.

By this time considerable juice has been caused to exude from the fruit, by heating it in the sugar-sirup. This I boil with the sirup and sulphite, until the liquor ropes, or comes to a jelly. I then pour the liquor over the fruit in the jars.

After the fruit has remained in the jars for about a month, so that it is thoroughly permeated by the sugar, and is preserved by the sulphite, it is taken out of them, and placed on sieve-bottom pans and drained. It is then coated over with pulverized sugar, and placed immediately in a hot oven, where it remains fifteen or twenty minutes, or until it becomes glazed. It is then removed from the oven, and is ready to be packed in boxes for transportation, or to be stowed away for home consumption.

I am aware that candied fruits wholly preserved in sugar are not new. But I am also aware, that as a general thing, if they are boiled sufficiently long to preserve them, they become too soft to be candied, and the process of making candied fruit is entirely different from the above-described plan, which does not bring them to a candied, but to a semi-candied state, about half-way between figs and French candied fruits.

Other preserving-sulphites will answer in the place of sulphite of lime, but I prefer the latter, on account of its being free from unpleasant taste.

What I claim as my invention or discovery, and desire to secure by Letters Patent, is—

1. The preparatory process, by which the fruits are preserved in jars, substantially in the manner hereinbefore described.

2. The glazing and finishing-process, substantially as and for the purpose above set forth.

In testimony that the above is my invention, or discovery, I have hereunto set my hand and affixed my seal, this 1st day of December, 1868.

E. R. NORNY. [L. S.]

Witnesses:
 STEPHEN USTICK,
 JOHN WHITE.